United States Patent Office.

HORACE CLARK, OF NORTHAMPTON, MASSACHUSETTS, ASSIGNOR TO DWIGHT L. CLARK, OF SAME PLACE.

Letters Patent No. 75,732, dated March 24, 1868.

IMPROVED MEDICAL COMPOUND.

The Schedule referred to in these Letters Patent and making part of the same.

TO ALL PERSONS TO WHOM THESE PRESENTS MAY COME:

Be it known that I, HORACE CLARK, of Northampton, in the county of Hampshire, and State of Massachusetts, have invented a new and useful Medical Composition or Liniment; and I do hereby declare the same to be fully described in the following specification.

The ingredients of the said composition are as follows, by measure: Olive oil, one part; oil of origanum, one part; and essential oil of turpentine and tar, or either, one part. These matters are to be mixed together in a vessel, and when so compounded, will constitute a very useful medical composition, whether for internal or external use.

It is useful in the alleviation or cure of sore throat or disease of the lungs or bronchial tubes, a dose being from ten to thirty drops, taken in sugar or otherwise. It has cooling and soothing properties, and reduces inflammation, and is very healing. It is also an excellent vermifuge. For rheumatic or other pains in the limbs it is an excellent liniment.

I do not limit my invention to the precise proportions of its constituents as hereinbefore set forth, as such may be varied somewhat without materially changing its character or properties.

What I claim as my invention, is—

The above-explained composition, as composed of the constituents hereinbefore mentioned, such being for the purpose or purposes as set forth.

HORACE CLARK.

Witnesses:
ASAHEL KING,
MARY J. CLARK.